United States Patent
Halfmann et al.

(10) Patent No.: US 7,027,315 B2
(45) Date of Patent: Apr. 11, 2006

(54) CIRCUIT ARRANGEMENT FOR OPERATING AN ELECTRICAL MACHINE

(75) Inventors: Juergen Halfmann, Buehl (DE); Ingo Immendoerfer, Buehl (DE)

(73) Assignee: Robert Bosh GmbH, Stuttgart (DE)

( * ) Notice: Subject to any disclaimer, the term of this patent is extended or adjusted under 35 U.S.C. 154(b) by 220 days.

(21) Appl. No.: 10/466,025

(22) PCT Filed: Jun. 28, 2002

(86) PCT No.: PCT/DE02/02358

§ 371 (c)(1),
(2), (4) Date: Jul. 10, 2003

(87) PCT Pub. No.: WO03/047082

PCT Pub. Date: Jun. 5, 2003

(65) Prior Publication Data

US 2004/0041549 A1    Mar. 4, 2004

(30) Foreign Application Priority Data

Nov. 20, 2001  (DE) ................. 101 56 939

(51) Int. Cl.
*H02M 3/18*  (2006.01)
*H02M 7/5387*  (2006.01)
(52) U.S. Cl. .............. 363/56.02; 363/98; 363/132
(58) Field of Classification Search ........... 363/56.01, 363/56.02, 97, 98, 131, 132; 318/727, 729, 318/800, 801, 812
See application file for complete search history.

(56) References Cited

U.S. PATENT DOCUMENTS

| 5,428,522 | A |   | 6/1995 | Millner et al. |
| 5,936,371 | A | * | 8/1999 | Bolash et al. ............... 318/685 |
| 6,310,469 | B1 |   | 10/2001 | Bentolila et al. |
| 6,518,723 | B1 | * | 2/2003 | Oku ........................... 318/801 |
| 6,548,971 | B1 | * | 4/2003 | Gokturk ..................... 318/114 |
| 6,748,618 | B1 | * | 6/2004 | Darby et al. .................... 8/159 |

FOREIGN PATENT DOCUMENTS

| DE | 42 29 440 | 3/1994 |
| DE | 198 41 341 | 3/2000 |
| EP | 0 444 404 | 9/1991 |

* cited by examiner

*Primary Examiner*—Matthew V. Nguyen
(74) *Attorney, Agent, or Firm*—Kenyon & Kenyon

(57) ABSTRACT

A circuit arrangement for operating an electrical machine having an inductive component. The circuit arrangement includes an electrical switch (TR1 through TR6) that applies a pulse-shaped signal (S1 through S4) to the electrical machine. The free-running circuit also includes an electrical switch (TR1 through TR6). A comparator (15) is provided which compares the free-running current flowing in the free-running circuit with a predefined threshold value and, if the current drops below the threshold value, provides a switching signal (S3A) that is used to deactivate the switch (TR1 through TR6) in the free-running circuit. The circuit arrangement reduces both the electrical power loss in the circuit arrangement and the mechanical power loss in the electrical machine.

10 Claims, 3 Drawing Sheets

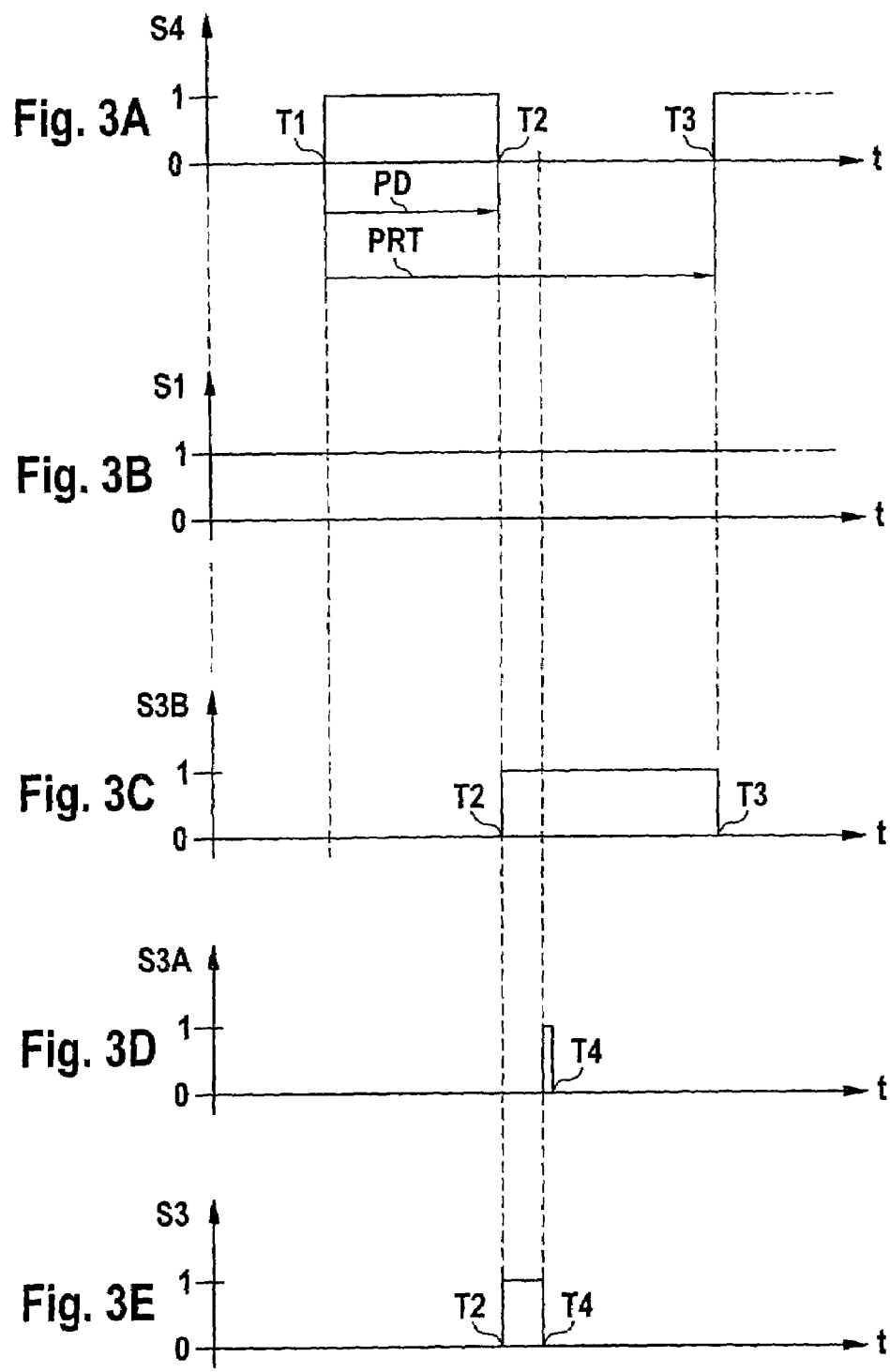

CIRCUIT ARRANGEMENT FOR OPERATING AN ELECTRICAL MACHINE

BACKGROUND INFORMATION

The present invention relates to a circuit arrangement for operating an electrical machine.

A circuit arrangement for activating and deactivating an electrical machine, having an inductive component in which a free-running circuit that is connected in parallel to the electric machine reduces the magnetic energy stored in the inductive component after deactivation, is known from German Patent Application A 42 29 440. The free-running circuit includes a switch, for example a MOSFET, that is activated immediately after deactivation of the output stage. The advantage of using a switch in free-running mode instead of a diode is that less power is lost while current is flowing in the free-running circuit. The active state of the switch positioned in the free-running circuit ends when an activation signal is generated for the electrical machine.

A step-down constant-current transformer, which is equipped with switches operating as synchronous rectifiers to reduce power loss, is known from German Patent Application A 198 41 341. In pulsating mode, a reverse current that flows through the choke from the output in the direction of the input may temporarily occur. To avoid the reverse current flowing through the synchronous rectifier, a device for detecting the current direction is provided to evaluate the voltage drop across the synchronous rectifier.

The object of the present invention is to provide a circuit arrangement for operating electrical machines having an inductive component that makes it possible to optimize efficiency.

The object is achieved by the features specified in the independent claim.

ADVANTAGES OF THE INVENTION

In the circuit arrangement according to the present invention for operating an electrical machine having an inductive component, a switch is initially provided that applies a pulse-shaped control signal to the electrical machine. A free-running circuit that also includes a switch is present. A comparator compares the current flowing in the free-running circuit with a predefined threshold value and, if the current drops below the threshold value is undershot, provides a switching signal that is used to deactivate the switch in the free-running circuit.

The circuit arrangement according to the present invention makes it possible to activate a free-running mode.

An important advantage of the circuit arrangement according to the present invention is that it reduces power loss. This reduction in power loss applies to the electrical losses in the free-running circuit that result in heating as well as to the mechanical losses in the electrical machine.

The electrical losses in the free-running circuit are reduced by the switch used according to the related art described in German Patent Application A 42 29 440 instead of by a diode. The mechanical losses in the electrical machine are reduced by detecting the free-running current flowing in the free-running circuit, this current being compared to a predefined threshold value by the comparator. The switching signal generated by the comparator deactivates the switch in the free-running circuit if the current drops below the threshold value. Due to the mechanical energy stored in the electrical machine, the electrical machine continues to rotate during interpulse pauses in the pulse-shaped control signal. If the switch in the free-running circuit were not deactivated, the induced voltage present across the inductive component of the electrical machine would cause, upon the decay of the free-running current initially flowing in the positive direction, a rapid rise in free-running current in the negative direction, which is associated with an unwanted braking of the electrical machine. The features according to the present invention effectively prevent this braking action from occurring by deactivating the electronic switch in the free-running circuit.

The circuit arrangement according to the present invention is particularly suitable for operating the electrical machine using a pulse-width-modulated signal that is used to set the average operating voltage of the electrical machine.

Advantageous embodiments and refinements of the circuit arrangement according to the present invention are derived from the dependent claims.

According to an advantageous embodiment, the threshold value of the comparator is set to a value of at least approximately zero. This makes it possible to detect a zero current that results in the provision, by the comparator, of the switching signal that deactivates the switch in the free-running circuit at the optimum point in time.

According to an advantageous embodiment, the current flowing in the free-running circuit is detected on the basis of the voltage drop across the switch in the free-running circuit. A separate current sensor is unnecessary.

According to an advantageous embodiment of the circuit arrangement according to the present invention, the windings of the electrical machine are positioned in an H-bridge circuit that includes two high-side switches and two low-side switches. The bridge circuit enables the electrical machine to reverse its direction of rotation.

According to an advantageous embodiment of the H-bridge, one high-side switch is continuously active, one low-side switch is supplied with a pulse width modulated control signal, and the other high-side switch is assigned the free-running function.

According to an advantageous alternative embodiment of the H-bridge circuit, one low-side switch is continuously active, one high-side switch is supplied with the pulse-width-modulated control signal, and the other low-side switch is assigned the free-running function.

According to an advantageous embodiment, MOSFET transistors are used as switches. Due to their low forward resistance in the active state, transistors of this type are especially suitable for applications that have low operating voltages and high operating currents.

The circuit arrangement according to the present invention is preferably used in polyphase machines such as BLDC (brushless DC) motors and multiple-phase synchronous motors.

Additional advantageous embodiments and refinements of the circuit arrangement according to the present invention are derived from the additional dependent claims and the following description.

DRAWING

FIGS. 3A–3E show signal curves as a function of time in the bridge inverter according to FIG. 1 and the H-bridge according to FIG. 2.

Figure 1:
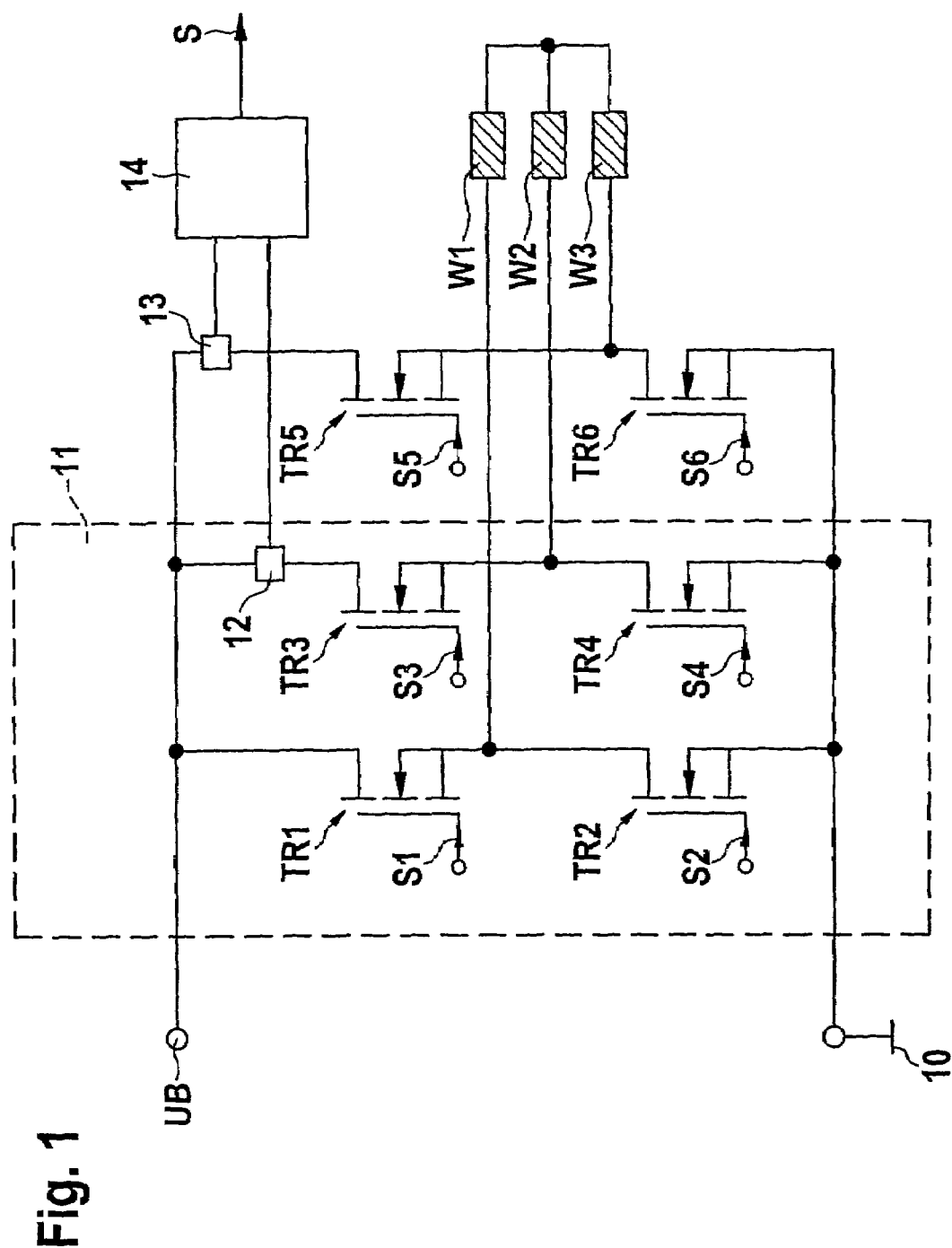
FIG. 1 shows a block diagram of a bridge inverter circuit having a three-phase BLDC motor.

The bridge inverter illustrated in FIG. 1 includes three series circuits, located between a supply voltage UB and ground 10, each of which includes two switches TR1, TR2; TR3, TR4; TR5, TR6. Switches TR1, TR3, TR5 connected to supply voltage UB are referred to as high-side switches, while switches TR2, TR4, TR6 connected to ground 10 are referred to as low-side switches. Switches TR1, TR2; TR3, TR4; TR5, TR6 are controlled by a first, second, third, fourth, fifth and sixth control signal S1, S2, S3, S4, S5, S6.

An electrical machine, which is not illustrated in further detail, includes a first, second and third winding W1, W2, W3. Windings W1, W2, W3 are connected in a star configuration. The series circuit formed by first and second windings W1, W2 is located in the diagonal of an H-bridge 11 that includes switches TR1 and TR3 as high-side switches and switches TR2 and TR4 as low-side switches. The series circuit formed by second and third windings W1, W3 is located in the diagonal of an H-bridge that includes switches TR3 and TR5 as high-side switches and switches TR4 and TR6 as low-side switches. The series circuit formed by first and third windings W1, W3 is located in the diagonal of an H-bridge that includes switches TR1 and TR5 as high-side switches and switches TR2 and TR6 as low-side switches.

The current flowing in switch TR3 is detected by a first current detector 12, and the current flowing in switch TR5 is detected by a second current detector 13. Current detectors 12, 13 are connected to a current analyzer system that emits a switching signal S.

Figure 2:
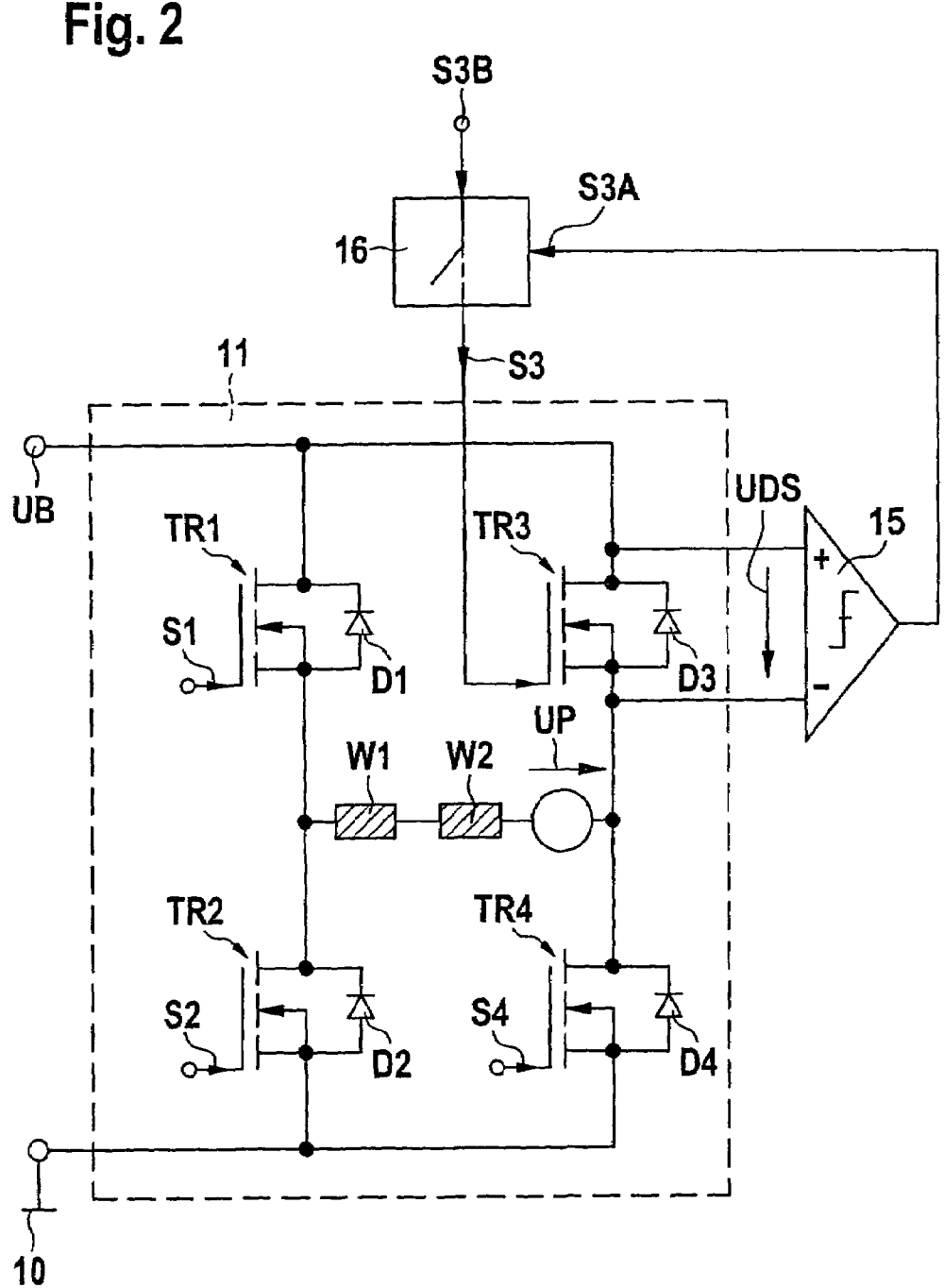
FIG. 2 shows an H-bridge as a detail of the bridge inverter illustrated in FIG. 1.

FIG. 2 shows a detailed view of H-bridge 11, which is identified by the broken line in FIG. 1. Structure-specific diodes D1 through D4, whose cathode-side ends each point in the direction of supply voltage UB, are shown near switches TR1 through TR4. The series circuit of first and second winding W1, W2 of the electrical machine, which is not illustrated in further detail, is supplemented by an induced voltage UP, which, in synchronous machines, is referred to as the synchronous electromotive force.

Voltage drop UDS across switch TR3 is supplied to a comparator 14, which sends a switching signal S3A to a switching logic 15. Switching logic 15 sends third control signal S3 to third switch TR3 as a function of switching signal S3A and as a function of a further switching signal S3B.

FIGS. 3A through 3E show first, third and fourth control signals S1, S3, S4 as well as switching signals S3A and S3B as a function of time t in each case.

Fourth control signal S4 changes from an inactive level zero to an active level one at a first point in time T1 and from active level one to inactive level zero at a second point in time T2. The difference between second and first points in time T1, T2 is equal to a activation, time PD. Fourth control signal S4 changes back from inactive level zero to active level one at a third point in time T3. The difference between third point in time and first point in time T3, T1 is equal to a period PRT.

According to FIG. 3B, first control signal S1 is continuously set to active level one during the illustrated time segment.

According to FIG. 3C, switching signal S3B changes from inactive level zero to active level one at second point in time T2 and from active level one to inactive level zero at third point in time T3.

Switching signal S3A occurs at a fourth point in time T4, which lies between second and third points in time T2, T3. Switching signal S3A changes in a pulsating manner from inactive level zero to active level one and back to inactive level zero.

Third control signal S3 illustrated in FIG. 3E changes from inactive level zero to active level one at second point in time T2 and returns to inactive level zero at fourth point in time T4.

To avoid bridge short-circuits, differential times, which are not discussed in further detail here, are added in practice.

The circuit arrangement according to the present invention is explained in greater detail on the basis of FIG. 2:

Based on the bridge inverter illustrated in FIG. 1, FIG. 2 shows a detailed view of H-bridge 11 that is highlighted in FIG. 1. Switching functions, which are not discussed in further detail, occur in the additional H-bridges as a function of the predefined flow schemes of windings W1, W2, W3 of the electrical machine, which is not illustrated in further detail. Current detectors 12, 13, current evaluation system 14 and switching signal S illustrated in FIG. 1 correspond to voltage drop UDS, comparator 15 and switching signal S3A in FIG. 2. Accordingly, the current is detected only by evaluating voltage drop UDS across third switch TR3 and supplied to comparator 15, without using an additional sensor. In the illustrated exemplary embodiment, the threshold value needed for comparator 15 is identical to a reference value of voltage drop UDS, which should be equal to the potential present at the connection between third and fourth switches TR3, TR4. If voltage drop UDS exceeds the threshold value, switching signal S3A assumes the zero level, and if voltage drop UDS drops below the threshold value, switching signal S3A assumes active level one.

Switching signal S3A is supplied to switching logic 16, which provides third control signal S3, which is intended for third switch TR3 and is generated from switching signal S3B. Switching signal S3B and additional control signals S1, S2, S3 are provided by a control circuit that is not illustrated in further detail.

By way of example, H-bridge 11 illustrated in FIG. 2 is equivalent to the energizing of first and second windings W1, W2 of star-connected windings W1, W2, W3. Activation time PD of fourth switch TR4 corresponds to the energizing phase, and the time difference between third and second points in time T3, T2 corresponds to the free-running phase of first and second winding W1, W2. The process repeats periodically within period PRT shown in FIG. 3A. This results in a pulsating operation. Pulse-width modulation is preferably provided, the modulation being carried out, in particular, by varying activation time TD. If necessary, period PRT may be exclusively or additionally varied. For example, period PRT may lie within a microsecond range according to a clock frequency in the kilohertz range.

The procedure illustrated in greater detail in FIG. 2 may be used in the same manner for all other winding combinations W1, W3; W2, W3. The remarks below are equally valid for delta-connected windings W1, W2, W3. Instead of sets of two windings W1, W2; W1, W3; W2, W3, windings W1, W2, W3 in this embodiment are each located individually in the diagonal of the H-bridge circuits.

In the exemplary embodiment illustrated in FIG. 2, only voltage drop UDS across third switch TR3 is shown. In general, voltage drops UDS across all high-side switches TR1, TR3, TR5 or even across all switches TR1–TR6 of the inverter are provided.

Upon energizing windings W1, W2 during activation time TD, a current builds up which flows through first switch TR1, through both windings W1, W2 and through fourth switch TR4. The current flow results in a positive power conversion in first and second winding W1, W2, which is represented by product UP*I and drives the electrical machine, which is not illustrated in further detail. At the end of activation time TD, the free-running phase of the current flowing through first and second winding W1, W2 begins between second and third points in time T2, T3. The free-running phase begins upon deactivation of fourth switch TR4 at second point in time T2.

In an alternative embodiment that is not illustrated, first switch TR1 may also be closed. If, according to the illustrated exemplary embodiment, fourth switch TR4 is blocked at second point in time T2, this produces a free-running current that flows through first switch TR1, first and second windings W1, W2 and third switch TR3.

Switches TR1 through TR6 conducting the free-running current must be suitably designed to conduct the free-running current. The illustrated exemplary embodiment preferably uses field-effect transistors, in particular MOS field-effect transistors that include structure-specific diodes D1 through D4. If a suitable free-running current path is not prepared in switches TR1 through TR6, discrete structural components that are able to conduct the free-running current must be provided. The free-running current in third switch TR3 generates a voltage drop corresponding to the diode conducting voltage across third diode D3.

The power loss is significantly reduced, according to the present invention, when switches TR1 through TR6—or switch TR3 in the exemplary embodiment—are activated during free-running operation. In free-running mode, third switch TR3 is operated inversely. Switching signal S3B supplied by the control circuit, which is not illustrated in further detail, for third switch TR3 is maintained at the active level during the free-running phase between second and third times T2, T3, as shown in FIG. 3C. Because the conducting voltage of third diode D3 has been eliminated, only low voltage drop UDS occurs, which corresponds to the conducting voltage of third switch TR3 in the conducting state.

The free-running current also produces positive potential in first and second windings W1, W2, according to positive product UP*I. The inductive energy stored in the inductive component of both windings W1, W2 is consumed.

Because the electrical machine continues to rotate, the free-running current still flows after the decay of the inductively stored energy, since it is maintained by induced voltage UP of the electrical machine. However, the free-running current that is still maintained by induced voltage UP now has the opposite sign. In this mode, an unwanted negative potential occurs across first and second windings W1, W2, corresponding to a braking of the electrical machine.

The free-running current is detected, and is determined indirectly in the illustrated exemplary embodiment via voltage drop UDS. The free-running current is compared to a predefined threshold value of comparator 15. In the illustrated exemplary embodiment, the threshold value is formed by the reference potential of voltage drop UDS. Comparator 15 emits switching signal S3A at fourth point in time T4 if voltage drop UDS at least approximately changes its sign. Depending on the sign change of voltage drop UDS, free-running current passes through zero at this point in time and changes from a positive to a negative value at point in time T4.

Switching signal S3A emitted by comparator 15 is supplied to switching logic 16, which suppresses switching signal S3B from fourth point in time T4 onward. Third control signal S3 is therefore supplied to the third switch only during a period of time corresponding to the difference between fourth and second points in time T4, T2, as shown in FIG. 3E. Third switch TR3 is thus deactivated at fourth point in time T4. Third diode D3 is automatically blocked after the free-running current passes through zero. This means that the free-running current is no longer able to continue flowing through third switch TR3 from fourth point in time T4 onward.

Second switch TR2 may be used instead of third switch TR3 to conduct the free-running current. In this embodiment, a control signal S1 corresponding to fourth control signal S4 shown in FIG. 3A is applied to first switch TR1, and a control signal S4 corresponding to first control signal S1 of first switch TR1 shown in FIG. 3B is applied to fourth switch TR4.

In this embodiment, voltage drop UDS must be analyzed at second switch TR2.

By activating a free-running mode, the circuit arrangement according to the present invention provides a low-loss mode of operation that requires less cooling effort for the inverter. The circuit arrangement according to the present invention is therefore especially suitable for operating high-amperage electrical machines. BLDC motors or asynchronous motors are preferably used as electrical machines. At comparatively low operating voltages in a range of less than 100 volts, which are available, for example, in motor vehicles, switches TR1 through TR6 may be implemented in the form of field-effect transistors, in particular MOS field-effect transistors, that include diodes D1 through D4 for structural reasons.

What is claimed is:

1. A circuit arrangement for operating an electrical machine which includes an inductive component, the circuit arrangement comprising:
   a switch arrangement to switch the electrical machine using a pulse-shaped signal;
   a free-running circuit arrangement, which includes the switch arrangement;
   a comparator arrangement to compare free-running current flowing in the free-running circuit arrangement with a predefined threshold value, and, in response to the free-running current dropping below the predefined threshold value, supplying a switching signal to deactivate the switch arrangement in the free-running circuit arrangement;
   wherein the predefined threshold value is set fixed to zero to detect a zero passage of the free-running current.

2. The circuit arrangement of claim 1, wherein the free-running current is detected indirectly via a voltage drop across the switch arrangement.

3. The circuit arrangement of claim 1, wherein the electrical machine is positioned in a diagonal of an H-bridge, which has two high-side switches and two low-side switches of the switch arrangement.

4. The circuit arrangement of claim 3, wherein one of the high-side switches is continuously active, one of the low-side switches is supplied with the pulse-shaped signal, and the other one of the high-side switches is assigned a free-running function.

5. The circuit arrangement of claim 3, wherein one of the low-side switches is continuously active, one of the high-side switches is supplied with the pulse-shaped signal, and the other of the low-side switches is assigned a free-running function.

6. The circuit arrangement of claim 1, wherein the pulse-shaped signal is pulse-width-modulated to set an average operating voltage of the electrical machine.

7. The circuit arrangement of claim 1, wherein the switch arrangement includes MOS field-effect transistors.

8. The circuit arrangement of claim 1, wherein the electrical machine includes a polyphase machine.

9. The circuit arrangement of claim 8, wherein the electrical machine includes an electronically commutated DC motor.

10. The circuit arrangement of claim 1, wherein the electrical machine includes an asynchronous motor.

* * * * *

UNITED STATES PATENT AND TRADEMARK OFFICE
CERTIFICATE OF CORRECTION

| | | |
|---|---|---|
| PATENT NO. | : 7,027,315 B2 | Page 1 of 4 |
| APPLICATION NO. | : 10/466025 | |
| DATED | : April 11, 2006 | |
| INVENTOR(S) | : Halfmann et al. | |

It is certified that error appears in the above-identified patent and that said Letters Patent is hereby corrected as shown below:

On the Title Page, Item (57) under the heading "Abstract", line 3, delete "(TR1 through TR6)"

On the Title Page, Item (57) under the heading "Abstract", line 4, delete "(S1 through S4)"

On the Title Page, Item (57) under the heading "Abstract", line 6, change from "switch (TR1 through TR6)." to --switch.--

On the Title Page, Item (57) under the heading "Abstract", line 6, delete "(15)"

On the Title Page, Item (57) under the heading "Abstract", line 10, delete "(TR1 through TR6)"

Column 1, line 4, change "BACKGROUND INFORMATION" to --FIELD OF THE INVENTION--

Column 1, line 8, insert heading --BACKGROUND INFORMATION--

Column 1, line 12, change "is known from" to --is referred to in--

Column 1, line 13, change "Application A" to --Application No.--

Column 1, line 23, change " is known from" to --is referred to in--

Column 1, line 24, change "A 198 41 341." to --No. 188 41 341.--

Column 1, line 29, insert --SUMMARY OF THE INVENTION--

Column 1, line 30, change "The object of the present invention" to --An object of the exemplary embodiment of the present invention--

Column 1, line 34, delete "The object is achieved by the features specified in the independent claim."

Column 1, line 37, delete "ADVANTAGES OF THE INVENTION"

Column 1, line 51, change "An important advantage" to --An advantage--

Column 1, line 52, change "that it reduces" to --that it may reduce--

UNITED STATES PATENT AND TRADEMARK OFFICE
CERTIFICATE OF CORRECTION

| | |
|---|---|
| PATENT NO. | : 7,027,315 B2 |
| APPLICATION NO. | : 10/466025 |
| DATED | : April 11, 2006 |
| INVENTOR(S) | : Halfmann et al. |

It is certified that error appears in the above-identified patent and that said Letters Patent is hereby corrected as shown below:

Column 2, line 8, change "the present invention" to --the exemplary embodiment and/or exemplary method of the present invention--

Column 2, line 16, delete "Advantageous embodiments and refinements of the circuit arrangement according to the present invention are derived from the dependent claims."

Column 2, line 19, change "an advantageous embodiment," to --an exemplary embodiment--

Column 2, line 25, change "an advantageous embodiment" to --an exemplary embodiment--

Column 2, line 29, change "an advantageous embodiment" to --an exemplary embodiment--

Column 2, line 35, change "an advantageous embodiment" to --an exemplary embodiment--

Column 2, line 40, change "an advantageous embodiment" to --an exemplary embodiment--

Column 2, line 51, change "is preferably used" to --may be used--

Column 2, lines 54-57, delete "Additional advantageous embodiments and refinements of the circuit arrangement according to the present invention are derived from the additional dependent claims and the following description."

Column 2, line 59, change "DRAWING" to --BRIEF DESCRIPTION OF THE DRAWINGS--

Column 2, line 62, change "BLDC motor;" to --BLDC motor.--

Column 2, line 64, change "in FIG.1; and" to --in FIG.1.--

UNITED STATES PATENT AND TRADEMARK OFFICE
CERTIFICATE OF CORRECTION

PATENT NO.        : 7,027,315 B2
APPLICATION NO. : 10/466025
DATED             : April 11, 2006
INVENTOR(S)       : Halfmann et al.

It is certified that error appears in the above-identified patent and that said Letters Patent is hereby corrected as shown below:

Column 2, lines 65-67, change "FIGS. 3A-3E show signal curves as a function of time in the bridge inverter according to FIG.1 and the H-bridge according to FIG.2." to --Figure 3A shows a signal curve as a function of time in the bridge inverter according to Figure 1 and the H-bridge according to Figure 2.

Figure 3B shows another signal curve as a function of time in the bridge inverter according to Figure 1 and the H-bridge according to Figure 2.

Figure 3C shows another signal curve as a function of time in the bridge inverter according to Figure 1 and the H-bridge according to Figure 2.

Figure 3D shows another signal curve as a function of time in the bridge inverter according to Figure 1 and the H-bridge according to Figure 2.

Figure 3E shows another signal curve as a function of time in the bridge inverter according to Figure 1 and the H-bridge according to Figure 2. --

Column 3, line 1, insert heading --DETAILED DESCRIPTION--

Column 3, line 17, change "windings W1, W3" to --windings W2, W3--

Column 4, line 44, change "is preferably embodied" to --may be provided--

Column 4, line 16, change "preferably uses" to --may use--

Column 4, line 25, change "present invention" to --exemplary embodiment and/or exemplary method of--

Column 5, line 14, change "must be suitably designed" to --must be suitable--

UNITED STATES PATENT AND TRADEMARK OFFICE
CERTIFICATE OF CORRECTION

| | |
|---|---|
| PATENT NO. | : 7,027,315 B2 |
| APPLICATION NO. | : 10/466025 |
| DATED | : April 11, 2006 |
| INVENTOR(S) | : Halfmann et al. |

It is certified that error appears in the above-identified patent and that said Letters Patent is hereby corrected as shown below:

Column 6, line 24, change "motors are preferably used" to --motors may be used--

Signed and Sealed this

Thirtieth Day of October, 2007

JON W. DUDAS
*Director of the United States Patent and Trademark Office*